United States Patent
Ohizumi et al.

(10) Patent No.: US 6,954,237 B2
(45) Date of Patent: *Oct. 11, 2005

(54) SURFACE-EMITTING DEVICE AND LIQUID CRYSTAL DISPLAY DEVICE

(75) Inventors: Mituso Ohizumi, Fukushima-ken (JP); Takuro Sugiura, Fukushima-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/361,791

(22) Filed: Feb. 10, 2003

(65) Prior Publication Data

US 2003/0174491 A1 Sep. 18, 2003

(30) Foreign Application Priority Data

Feb. 13, 2002 (JP) ......................................... 2002-035661

(51) Int. Cl.[7] ............................ G02F 1/1335; F21V 8/00
(52) U.S. Cl. ........................................ 349/63; 385/901
(58) Field of Search ............................ 349/61, 63, 65, 349/67; 362/26, 31, 244, 328, 332, 555, 561; 385/146, 901

(56) References Cited

U.S. PATENT DOCUMENTS 6,104,453 A    8/2000  Watanabe
6,734,929 B2 *  5/2004  Sugiura et al. ............... 349/65
2003/0165054 A1 *  9/2003  Ohizumi et al. .............. 362/31

FOREIGN PATENT DOCUMENTS

EP          0 969 311 A1     1/2000

* cited by examiner

Primary Examiner—Toan Ton
Assistant Examiner—Tai Duong
(74) Attorney, Agent, or Firm—Brinks Hofer Gilson & Lione

(57) ABSTRACT

A surface-emitting device includes a light guide panel, a light guide placed along one end face of the light guide panel, and light sources placed at ends of the light guide. A side face of the light guide facing the end face of the light guide panel serves as an emergent surface for applying light from the light sources to the light guide panel, and a side face remote from the emergent surface serves as a reflecting surface on which concave grooves for reflecting light propagating inside the light guide are periodically formed at a predetermined pitch. The depth of the concave grooves increases toward the center of the light guide, and the angle formed between two inclined faces that constitute each groove is within the range of 105° to 115°.

29 Claims, 4 Drawing Sheets

SURFACE-EMITTING DEVICE AND LIQUID CRYSTAL DISPLAY DEVICE

This application claims the benefit of priority to Japanese Patent Application 2002-035661, filed on Feb. 13, 2002.

BACKGROUND OF THE INVENTION

1. Field of the Invention

The present invention relates to a surface-emitting device and a liquid crystal display device, and more particularly, to the configuration of a surface-emitting device that makes the distribution of emergent light uniform.

2. Description of the Related Art

In known reflective liquid crystal display devices that perform display with ambient light used as a light source, the visibility of the display extremely decreases in an environment in which sufficient ambient light cannot be obtained, for example, when used in a dark place, because the luminance depends on the amount of ambient light. Accordingly, a liquid crystal display device has been proposed in which a front light (surface-emitting device) is placed as an auxiliary light source in front of a reflective liquid crystal display unit. The liquid crystal display device having the front light operates as a normal reflective liquid crystal display device in an environment in which sufficient ambient light can be obtained, for example, outdoors in the daytime, and illuminates the front light as the light source, as necessary. An example of a configuration of such a front light is shown in FIGS. 7 and 8.

A front light 110 shown in FIG. 7 includes a flat light guide panel 112 formed by injection-molding a transparent acrylic resin or the like, and a plurality of (two in the figure) light sources 111 disposed at an end face 112a of the light guide panel 112. The lower surface of the light guide panel 112 in the figure serves as an emergent surface from which light for illuminating a liquid crystal display unit is emitted, and a surface (the upper surface of the light guide panel 112) remote from the emergent surface serves as a prism surface 112c on which projections 114 shaped like a wedge in profile are continuously arranged in parallel to change the direction of light propagating inside the light guide panel 112. The light sources 111 are point light sources such as white LEDs (Light Emitting Diodes) or organic EL (Electro Luminescence) elements, and are arranged so that the light emitting direction points toward the end face 112a of the light guide panel 112.

In the front light 110 having the above configuration, light emitted from the light sources 111 is introduced into the light guide panel 112 through the end face 112a, and the light propagating therein is reflected by the prism surface 112c so as to change the propagating direction, and is emitted from the emergent surface (lower surface) of the light guide panel 112. A liquid crystal display unit or the like placed on the back side of the front light 110 is illuminated with the emitted light.

However, since the front light 110 has a structure in which the point light sources 111 are placed at the end face 112a of the light guide panel 112, the intensity of the light introduced into the light guide panel 112 is inevitably nonuniform, and as a result, light emitted from the emergent surface is also nonuniform. Accordingly, in order to increase the uniformity of the emitted light, a front light 120 is in practical use in which a light guide bar 113 is provided between a light guide panel 112 and light sources 115, as shown in FIG. 8.

In this front light 120, as shown in FIG. 8, the bar-shaped light guide bar 113 is placed along an end face of the light guide panel 112, and the light sources 115, such as LEDs serving as light-emitting elements, are placed at both ends in the longitudinal direction of the light guide bar 113. An outer side face (a side face remote from the light guide panel 112) 113a of the light guide bar 113 has a prismatic shape (not shown) that can reflect light propagating inside the light guide bar 113 so as to change the propagating direction.

Therefore, in the front light 120 shown in FIG. 8, light emitted from the light sources 115 is introduced into the light guide bar 113 through both end faces thereof, is caused by the prism surface formed on the outer side face 113a of the light guide bar 113 to change the propagating direction, and is introduced into the light guide panel 112 from the end face.

Since the front light 120 has the light guide bar 113 in this way, light is introduced from the entire connecting surface between the light guide panel 112 and the light guide bar 113 into the light guide panel 112, and this improves the uniformity of the light emitted from the emergent surface of the light guide panel 112.

While the distribution of emergent light is relatively uniform in the front light 120 having the above configuration, the luminance necessary to illuminate the liquid crystal display unit is insufficient. Furthermore, light introduced into the light guide panel 112 directly reaches the viewer from the surface (upper surface) of the light guide panel 112, and this causes a phenomenon in which the surface of the light guide panel 112 looks white (whitening), and reduces visibility.

Since the display quality has recently been improved for higher-definition and higher-contrast liquid crystal display devices, the front lights have been required to further improve the uniformity of emergent light, and the development of front lights that achieve a more uniform illumination has been demanded.

SUMMARY OF THE INVENTION

Accordingly, an object of the present invention is to provide a surface-emitting device that achieves high utilization efficiency of a light source and high uniformity of emergent light without causing whitening.

Another object of the present invention is to provide a liquid crystal display device provided with a surface-emitting device that has the above superior characteristics and high visibility.

In order to achieve the above objects, according to an aspect, the present invention provides a surface-emitting device including a light guide panel, a light guide placed along an end face of the light guide panel, and a light source placed at an end of the light guide, wherein a side face of the light guide facing the end face of the light guide panel serves as an emergent surface for applying light from the light source to the light guide panel, a side face remote from the emergent surface serves as a reflecting surface on which concave grooves, each having a pair of inclined faces for reflecting light propagating inside the light guide, are periodically formed at a predetermined pitch, the depth of the concave grooves increases toward the center of the light guide, and the angle formed between the two inclined faces constituting the groove is within the range of 105° to 115°.

In the surface-emitting device of the present invention, light emitted from the light sources placed at both ends of the light guide is reflected by the faces that constitute the concave grooves formed on one side face of the light guide, and is introduced into the light guide panel through the end face of the light guide panel. The light propagating inside the light guide panel is reflected in the light guide panel to change the propagating direction, and is emitted from the principal surface of the light guide panel.

By determining the shape of the concave grooves, which has an influence on the uniformity of light emitted from the light guide, as described above, in order to improve the uniformity of light applied from the light guide to the end face of the light guide panel, the light emitted from the light guide is efficiently supplied to the light guide panel, and the uniformity of light emitted from the light guide is improved. Consequently, the amount of light emitted from the principal surface of the light guide panel is increased, and the uniformity of the light is improved.

The depth of the concave grooves increases toward the center of the light guide. In this structure, the distribution in the longitudinal direction of emergent light from the light guide can be made uniform.

Preferably, the pitch of the grooves is set to be within the range of 0.01 mm to 0.5 mm. Preferably, the angle formed between the two inclined faces constituting the concave groove is set to be within the range of 105° to 115°. Such ranges make it possible to increase the amount of light emitted toward the light guide panel, to further enhance the utilization efficiency of the light sources, and to achieve a higher-luminance surface-emitting device. When the angle is less than 105°, the uniformity of emergent light from the light guide is reduced. When the angle exceeds 115°, the luminance of the surface-emitting device is reduced. Both cases are undesirable.

Preferably, the angle at the bottom of the concave groove is within the range of 108° to 112°. This can further increase the amount of light emitted toward the light guide panel, and can increase the luminance of the surface-emitting device.

The depth of the groove may exponentially or quadratically increase toward the center of the light guide. By setting the depth of the grooves according to such a relational expression, the distribution of emergent light in the longitudinal direction of the light guide can be made more uniform.

A reflective layer made of a metal thin film may be provided at least on the reflecting surface of the light guide. This makes it possible to prevent light from leaking from the side face having the concave grooves, to enhance the utilization efficiency of the light sources, and to achieve a high-luminance surface-emitting device. The reflective layer can be formed on the side faces of the light guide except the side face facing the end face of the light guide panel without any problem.

Preferably, the thickness of the reflective layer is within the range of 30 nm to 200 nm, and more preferably, within the range of 50 nm to 150 nm. When the thickness of the reflective layer is less than 30 nm, light leaks through the reflective layer, and this reduces the luminance of the surface-emitting device. When the thickness exceeds 200 nm, it takes a long time to form the reflective layer, and this decreases productivity. Within the range of 50 nm to 150 nm, a high-reflectivity reflective layer can be easily formed, and a high-luminance surface-emitting device can be easily produced.

Preferably, the distance between the emergent surface and the reflecting surface of the light guide is within the range of 2.5 mm to 3.5 mm. By setting the distance between the emergent surface and the reflecting surface of the light guide within such a range, light introduced from the light guide into the light guide panel can be prevented from leaking from the principal surface of the light guide panel, and the luminance of the surface-emitting device can be improved.

Preferably, the center of a light-emitting portion of the light source is aligned with almost the center in the thickness direction of the light guide. This structure makes it possible to improve the uniformity of light emitted from the light guide. The uniformity of the amount of light will not be impaired even when a large-area light guide panel is used.

According to another aspect, the present invention provides a liquid crystal display device wherein any of the above-described surface-emitting devices is provided in front of a liquid crystal display unit. Since such a structure allows the liquid crystal display unit to be uniformly illuminated with high luminance by the surface-emitting device, the visibility of the liquid crystal display device is enhanced.

Further objects, features, and advantages of the present invention will become apparent from the following description of the preferred embodiments with reference to the attached drawings.

DESCRIPTION OF THE PREFERRED EMBODIMENTS

An embodiment of the present invention will be described below with reference to the drawings.

Figure 1:
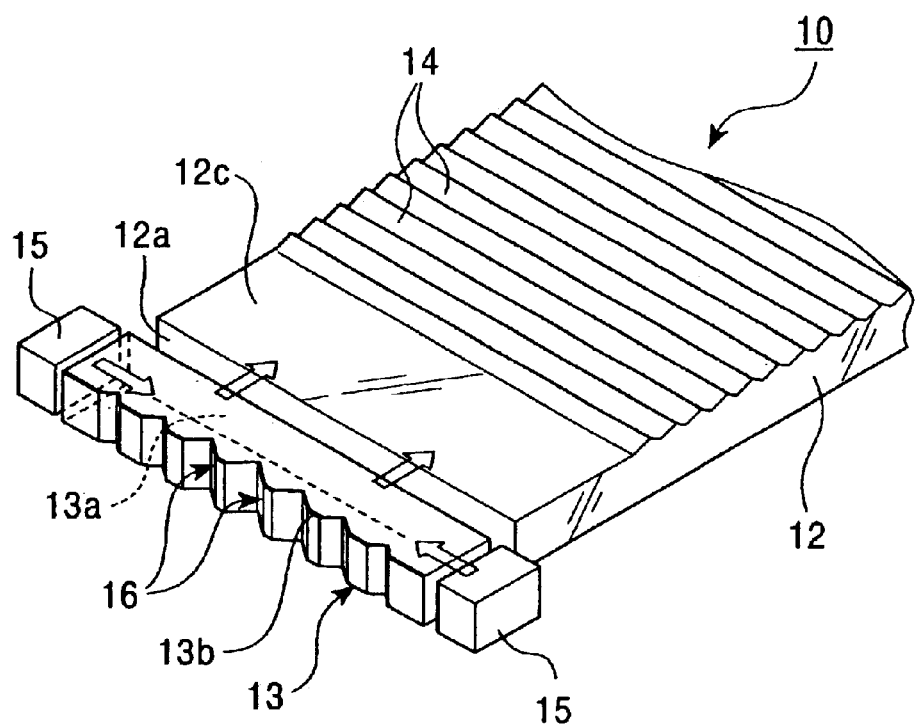
FIG. 1 is a partial perspective view of a front light according to an embodiment of the present invention.

FIG. 1 is a partial perspective view of a front light (surface-emitting device) according to an embodiment of the present invention. A front light 10 shown in this figure includes a flat light guide panel 12 composed of a transparent resin material, a light guide bar (light guide) 13 placed at an end on the side of an end face 12a of the light guide panel 12 (at one end on the short side of the rectangular light guide panel 12), and light-emitting elements (light sources) 15 disposed at both ends in the longitudinal direction of the light guide bar 13.

The light guide panel 12 is a transparent flat member, the end face 12a thereof facing the light guide bar 13 serves as a light incident surface, and the upper surface thereof serves as a reflecting surface 12c on which projections 14 substantially parallel to the end face 12a and having a wedge-shaped profile are formed in stripes and in parallel with one another. The light guide panel 12 reflects light introduced from the end face 12a by the reflecting surface 12c so as to change the propagating direction, and emits the light from a surface (lower surface in the figure) remote from the reflecting surface 12c.

The light guide panel 12 can be produced, for example, by injection-molding a flat plate from a transparent resin material such as acrylic resin. Besides acrylic resin, transparent resin materials, such as polycarbonate resin and epoxy resin, glass, and the like may be used as the materials of the light guide panel 12. More specifically, preferable examples are ARTON (trade name: manufactured by JSR Corporation) and ZEONOR (trade name: manufactured by Zeon Corporation), although the materials are not limited to them.

As shown in FIG. 1, the light guide bar 13 is a transparent member made of, for example, acrylic resin or polycarbonate resin and shaped like a quadrangular prism, and the light-emitting elements 15 formed of an LED (white LED) are placed at both ends in the longitudinal direction of the light guide bar 13. A side face of the light guide bar 13 remote from the light guide panel 12 serves as a reflecting surface 13b on which a plurality of (seven in the figure) of wedge-shaped grooves 16 are formed in stripes, as shown in FIG. 1, and the direction of the grooves 16 is in parallel with the end faces at which the light-emitting elements 15 are provided. By reflecting light introduced from the light-emitting elements 15 into the light guide bar 13 by the faces constituting the grooves 16, the propagating direction of the light is changed toward the light guide panel 12, and the light is applied to the end face 12a of the light guide panel 12. Light introduced from the light guide bar 13 into the light guide panel 12 propagates inside the light guide panel 12, is reflected by the faces, which constitute the projections 14 formed on the reflecting surface 12c, in order to change the propagating direction, and is emitted from the emergent surface (lower surface in the figure) of the light guide panel 12.

While the light-emitting elements 15 are formed of an LED in the front light 10 of this embodiment, any light-emitting elements that can be mounted at both end of the light guide bar 13 are applicable without problems, and for example, light-emitting elements, such as ELs (Electro Luminescence) elements are applicable. It is preferable that the light-emitting elements 15 be placed at the end faces of the light guide bar 13 so that the centers of the light-emitting regions of the light-emitting elements 15 are aligned with almost the center in the thickness direction of the light guide bar 13. Such placement makes it possible to reduce the amount of light that enters the side faces of the light guide bar 13 other than the reflecting surface 13b, and to improve the uniformity of the light emitted from the light guide bar 13.

Figure 2:
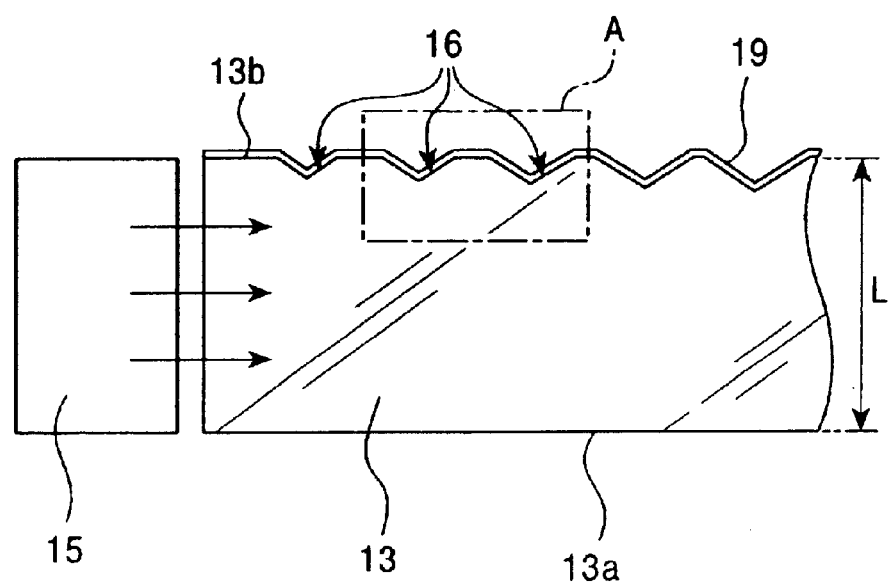
FIG. 2 is a partial plan view of a light guide bar shown in FIG. 1.

The structure of the light guide bar 13 that is a feature of the present invention will be described in detail below with reference to FIGS. 2 and 3. FIG. 2 is a partial plan view of the light guide bar 13 shown in FIG. 1, and FIG. 3 is an enlarged partial plan view of a section A shown in FIG. 2.

Figure 3:
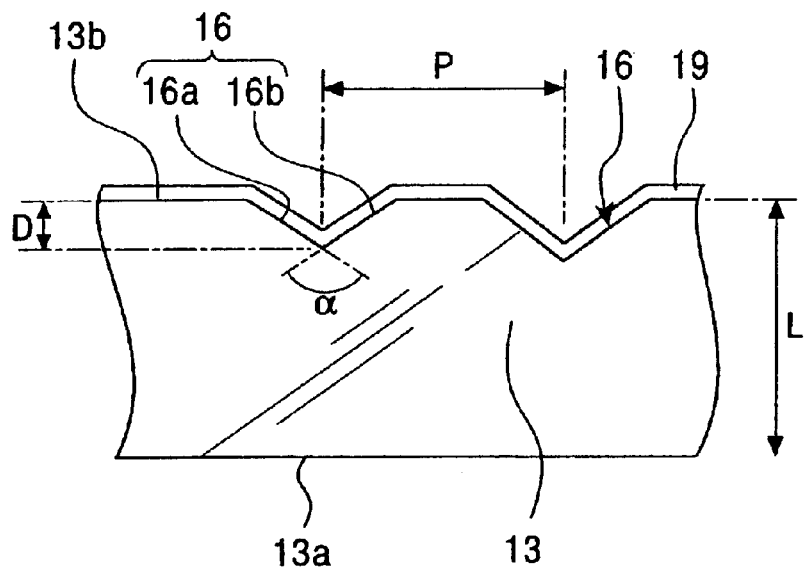
FIG. 3 is an enlarged partial plan view of a section A shown in FIG. 2.

The side face of the light guide bar 13 is provided with a plurality of wedge-shaped grooves 16, as shown in FIGS. 2 and 3, and each of the grooves 16 is formed by two inclined faces 16a and 16b inclined with respect to the emergent surface 13a of the light guide bar 13. The angle α formed between the inclined faces 16a and 16b is within the range of 105° to 115°. The uniformity of light emitted from the light guide bar 13 is reduced when the angle α is less than 105°, and the luminance is reduced when the angle α exceeds 115°. It is more preferable to set the angle α within the range of 108° to 112°. Such a range makes it possible to further increase the amount of light emitted toward the light guide panel 12 and to further enhance the luminance of the front light 10.

A reflective layer 19 made of a high-reflectance metal thin film of Al, Ag, or the like is formed on the reflecting surface 13b of the light guide bar 13. By forming the reflective layer 19, light leakage from the reflecting surface 13b can be prevented, the light reflectance at the inclined faces 16a and 16b of the grooves 16 can be enhanced, and the amount of light emitted toward the light guide panel 12 can be increased. Preferably, the thickness of the reflective layer 19 is set to be within the range of 30 nm to 200 nm, and more preferably, within the range of 50 nm to 150 nm. When the thickness is less than 30 nm, light leaks through the reflective layer 19, and this reduces the luminance of the surface-emitting device 10. When the thickness exceeds 200 nm, it takes a long time to form the reflective layer 19, and this decreases productivity. Within the range of 50 nm to 150 nm, a high-reflectivity reflective layer can be easily formed, and a high-luminance surface-emitting device can be easily produced.

Figure 4:
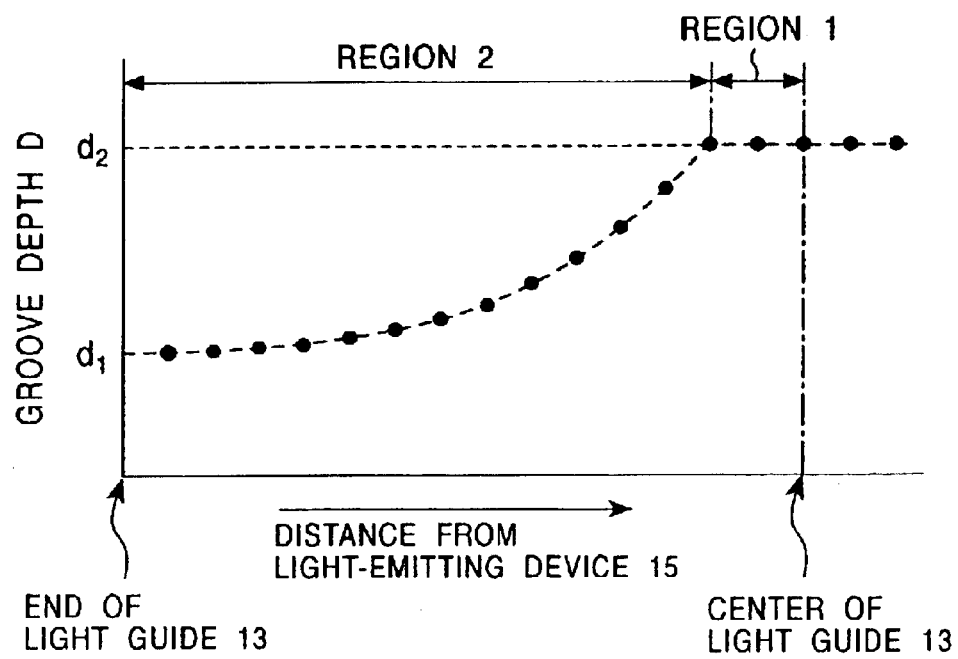
FIG. 4 is a graph showing the relationship between the depths of grooves formed on the light guide bar shown in FIGS. 1 and 2, and the distances from a light source thereto.

While the angle formed between the inclined faces 16a and 16b of the grooves 16 formed on the reflecting surface 13b in the surface-emitting device 10 of this embodiment is set within the above-described range, the depths D of the grooves 16 shown in FIG. 3 are also controlled to be predetermined depths. The depths D of the grooves 16 will be described in detail below with reference to FIG. 4. FIG. 4 is a graph showing the relationship between the depths D of the grooves 16 formed on the reflecting surface 13b of the light guide bar 13 and the distances from the light-emitting element 15 to the grooves 16. While FIG. 4 shows the depths of the grooves 16 between the center of the light guide bar 13 and one light-emitting element 15, the relationship between the distance to the other light-emitting element 15 and the groove depth D is symmetrical with respect to the center of the light guide bar 13. That is, two grooves 16 at the same distance from the center of the light guide bar 13 have the same depth D.

As shown in FIG. 4, the depths D of the grooves 16 differ between a region 1 near the center of the light guide bar 13 and a region 2 from the outer end of the region 1 to the light-emitting element 15. That is, the depths D of the grooves 16 are fixed at a depth $d_2$ in the region 1 near the center of the light guide bar 13, and the groove 16 closest to the light-emitting element 15 has a depth $d_1$ and the depth D increases toward the center of the light guide bar 13 in the region 2. The relationship between the distance from the light-emitting element 15 to the groove 16 and the depth D of the groove 16 in the region 2 is expressed by a quadratic function or an exponential function. That is, the depth D of a certain groove 16 can be expressed by a relational expression $D = at^2 + bt + d_1$ (a and b are constants) or $D = ce^t + d_1$ (c is a constant) using the distance t from the light-emitting element 15. The constants included in these relational expressions may be appropriately set to be optimum values depending on, for example, the length of the light guide bar 13.

More specifically, when the length of the light guide bar 13 is approximately 40 mm to 80 mm, the groove depth $d_1$ is set at approximately 20 μm and $d_2$ is set at approximately 50 μm in FIG. 4, and the groove depth D is gradually increased quadratically or exponentially from 20 μm in the region 2 from the light-emitting element 15 toward the center of the light guide bar 13.

It is preferable that the distance L between the reflecting surface 13b and the emergent surface 13a of the light guide bar 13 shown in FIG. 3 be within the range of 2.5 mm to 3.5 mm. When the distance L is less than 2.5 mm, it is bright adjacent to the light sources, and the uniformity of luminance is reduced. When the distance L exceeds 3.5 mm, the luminance is reduced.

Since the front light 10 of this invention has the above-described configuration, the uniformity of light introduced from the light guide bar 13 into the light guide panel 12 can be substantially improved. This makes it possible to improve the uniformity of light emitted from the light guide panel 12 and to increase the amount of the light. Therefore, for example, when the front light 10 of the present invention is placed in front of a liquid crystal display unit, high-luminance illumination is possible.

(Liquid Crystal Display Device)

Figure 5:
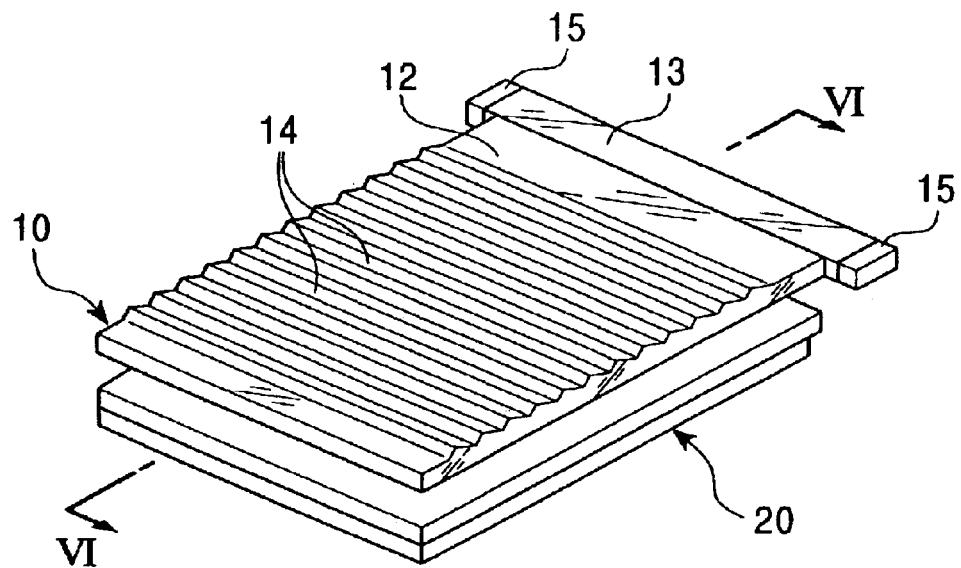
FIG. 5 is a perspective view showing an example of a liquid crystal display device having the front light shown in FIG. 1.
Figure 6:
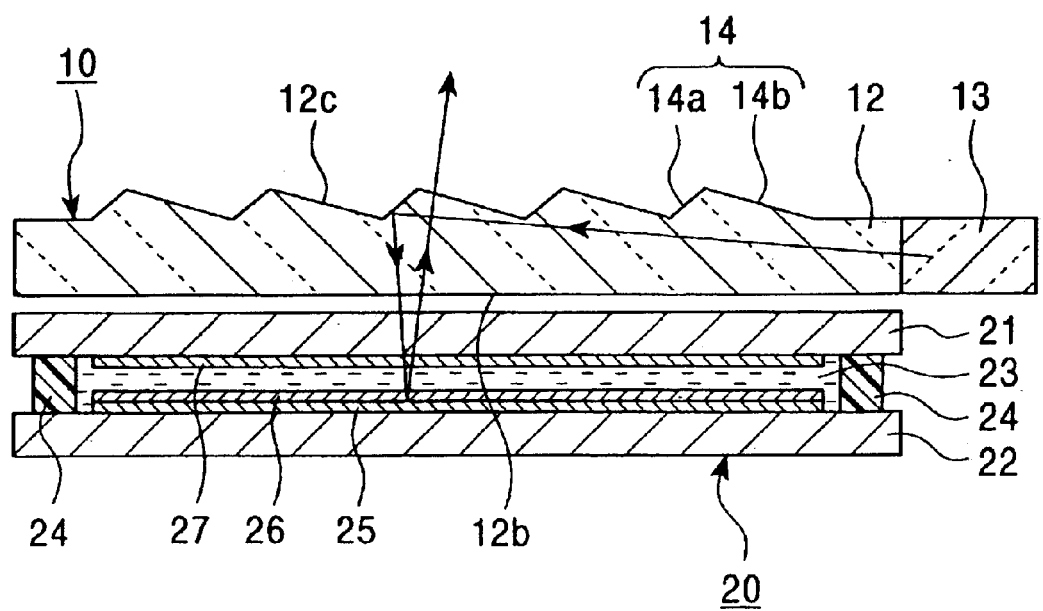
FIG. 6 is a schematic sectional view of the liquid crystal display device, taken along line VI—VI in FIG. 5.
Figure 7:
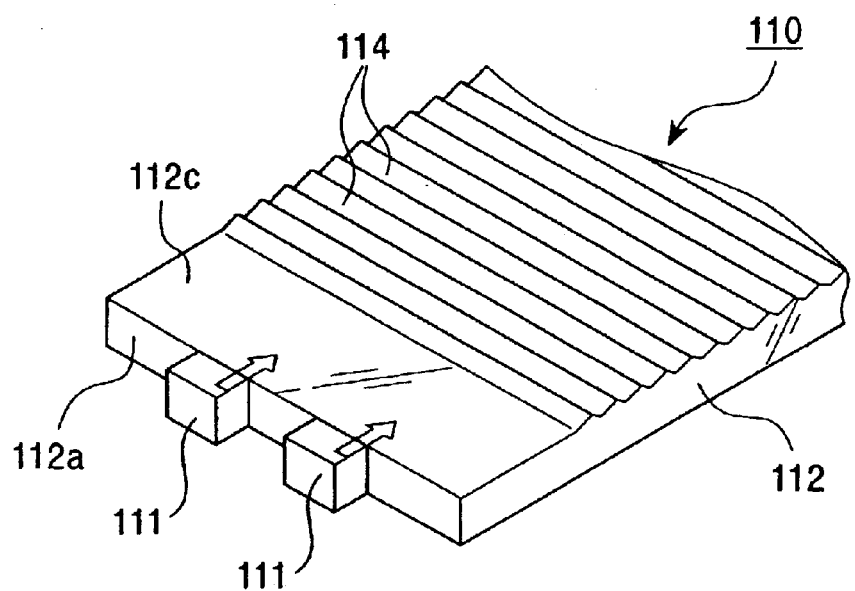
FIG. 7 is a perspective view showing the configuration of a conventional front light.
Figure 8:
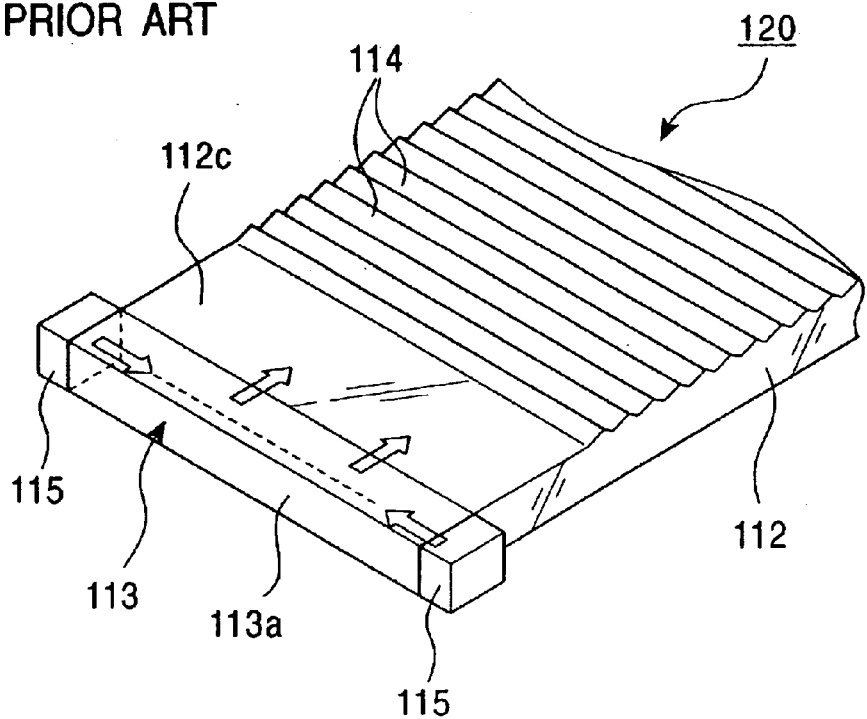
FIG. 8 is a perspective view showing the configuration of another conventional front light

A description will be given of a liquid crystal display device having the front light 10 of the above-described embodiment. FIG. 5 is a perspective view showing an example of a liquid crystal display device having the front light 10 shown in FIG. 1, and FIG. 6 is a schematic sectional view, taken along line VI—VI in FIG. 5. The liquid crystal display device shown in these figures broadly includes the front light 10, and a liquid crystal display unit 20 placed at the back thereof.

Since the configuration of the front light 10 is similar to that of the front light 10 shown in FIG. 1, a description thereof is omitted. A lower surface (on the side of the liquid crystal unit 20) of a light guide panel 12 serves as an emergent surface 12b from which light is emitted, as shown in FIG. 6. A surface (upper surface of the light guide panel 12) remote from the emergent surface 12b-serves as a reflecting surface 12c on which projections 14 having a wedge-shaped profile, each composed of a first inclined face 14a inclined with respect to the emergent surface 12b so as to change the direction of light inside the light guide panel 12, and a second inclined face 14b connected thereto, are periodically arranged.

As shown in FIG. 6, the liquid crystal display unit 20 has a structure in which a first substrate 21 and a second substrate 22 facing with a liquid crystal layer 23 therebetween are bonded and combined with a sealing member 24. On a side of the first substrate 21 close to the liquid crystal layer 23, a display circuit 27, including an electrode layer and an alignment film, for controlling the driving of the liquid crystal layer 23 is formed. On a side of the second substrate 22 close to the liquid crystal layer 23, a reflective film 25 for reflecting light entering the liquid crystal display unit 20 and a display circuit 26, including an electrode layer and an alignment film, for controlling the driving of the liquid crystal layer 23 are stacked in order. The reflective film 25 may have surface irregularities for diffusing reflected light.

In the liquid crystal display device having the above-described configuration, light emitted from light-emitting elements 15 is first introduced into a light guide bar 13, is reflected by a reflecting surface 13b of the light guide bar 13 so as to change the propagating direction, and is introduced into the light guide panel 12 from an end face facing an emergent surface of the light guide bar 13. The light propagating inside the light guide panel 12 is reflected by the inclined faces 14a of the reflecting surface 12c of the light guide panel 12 so as to change the propagating direction, so that light for illuminating the liquid crystal display unit 20 is emitted from the emergent surface 12b of the light guide panel 12.

Next, the light entering the liquid crystal display unit 20 reaches the reflective film 25 through the first substrate 21, the display circuit 27, the liquid crystal layer 23, and the display circuit 26, and is reflected by the reflective film 25 so as to return to the liquid crystal layer 23 again. The reflected light is emitted from the upper surface of the liquid crystal display unit 20, passes through the light guide panel 12, and reaches the user. Since the liquid crystal display device of the present invention thus uses the front light 10 as a light source for the reflective liquid crystal display unit 20, the display thereof is visible even in a dark place in which external light is insufficient. Moreover, it is possible to obtain a substantially uniform brightness over the entire display section, and to substantially increase the luminance, compared with the conventional liquid crystal display device.

EXAMPLES

While the present invention will be described in more detail below in conjunction with examples in order to make the advantages of the present invention more clear, it is not limited to the following examples.

In these examples, front lights that were different in the structure of the reflecting surface 13b of the light guide bar 13 were produced on the basis of the front light 10 shown in FIG. 1. The features of these front lights are shown in Table 1. In the front lights produced in these examples, white LEDs were used as the light-emitting elements 15, and the light guide panel 12 was formed of a flat panel of 50 mm×40 mm×0.7 mm molded from acrylic resin. Regarding the depth of a groove closest to the light-emitting element 15, of the grooves 16 formed on the reflecting surface 13b of the light guide bar 13, was set at 20 $\mu$m, and the thicknesses of grooves 16 at a distance of 3 mm or less from the center of the light guide bar 13 were fixed at 50 microns. The depth of the groove 16 was exponentially increased from the light-emitting element 15 toward the center of the light guide bar 13.

TABLE 1

| | Shape of Reflecting Surface 13b | | Depth of Light | Luminance Characteristics (cd/m$^2$) | |
|---|---|---|---|---|---|
| | Angle at Bottom of Groove (°) | Groove Pitch (mm) | Guide Bar (mm) | Average Luminance | Standard Deviation |
| Sample 1 | 100 | 0.16 | 3.0 | 6473 | 2320 |
| Sample 2 | 102 | 0.16 | 3.0 | 6755 | 2073 |
| Sample 3 | 105 | 0.16 | 3.0 | 7180 | 2205 |
| Sample 4 | 108 | 0.16 | 3.0 | 7270 | 2199 |
| Sample 5 | 110 | 0.16 | 3.0 | 7255 | 2149 |
| Sample 6 | 112 | 0.16 | 3.0 | 7266 | 2180 |
| Sample 7 | 115 | 0.16 | 3.0 | 7227 | 2248 |
| Sample 8 | 117 | 0.16 | 3.0 | 6871 | 2137 |
| Sample 9 | 120 | 0.16 | 3.0 | 6337 | 1995 |
| Sample 10 | 110 | 0.16 | 2.5 | 7555 | 2720 |
| Sample 11 | 110 | 0.16 | 3.5 | 6555 | 2149 |
| Comparative Sample 1 | 110 | 0.16 | 2.0 | 6821 | 5695 |
| Comparative Sample 2 | 110 | 0.16 | 4.0 | 3645 | 1414 |

Next, the above produced front lights were operated, and the amount of emergent light from the emergent surface (lower surface in the figure) of the light guide panel 12 and-the distribution thereof were measured. BM-5A (trade name: manufactured by Topcon Corporation) was used for the measurements. The measurement results are also shown in Table 1. As shown in Table 1, in the front lights of Samples 1 to 11 in which the shapes of the light guide bars 13 satisfied the requirement of the present invention, the luminance was substantially enhanced, the distribution of the luminance is uniform, and high-luminance and uniform illumination is possible. In contrast, front lights of Comparative Samples 1 and 2 in which the depth of the light guide bar 13 did not satisfy the requirement of the present invention, the uniformity of luminance or the average luminance was insufficient.

While the present invention has been described with reference to what is presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A surface-emitting device comprising:
a light guide panel;
a light guide placed along an end face of said light guide panel; and
a light source placed at an end of said light guide,
wherein a side face of said light guide facing said end face of said light guide panel serves as an emergent surface for applying light from said light source to said light guide panel, a side face remote from said emergent surface serves as a reflecting surface on which concave grooves are periodically formed at a predetermined pitch, each of said concave grooves having a pair of inclined faces for reflecting light propagating inside said light guide, a depth of said grooves increases toward the center of said light guide, and the angle formed between said two inclined faces constituting each of said grooves is within the range of 105° to 115°.

2. A surface-emitting device according to claim 1, wherein a pitch of said concave grooves is within the range of 0.01 mm to 0.5 mm.

3. A surface-emitting device according to claim 1, wherein the angle formed between said two inclined faces constituting each of said concave grooves is within the range of 108° to 112°.

4. A surface-emitting device according to claim 1, wherein the depth of said concave grooves exponentially or quadratically increases toward the center of said light guide.

5. A surface-emitting device according to claim 1, wherein a reflective layer composed of a metal thin film is provided at least on said reflecting surface of said light guide.

6. A surface-emitting device according to claim 5, wherein the thickness of said reflective layer is within the range of 30 nm to 200 nm.

7. A surface-emitting device according to claim 6, wherein the thickness of said reflective layer is within the range of 50 nm to 150 nm.

8. A surface-emitting device according to claim 1, wherein the distance between said emergent surface and said reflecting surface of said light guide is within the range of 2.5 mm to 3.5 mm.

9. A surface-emitting device according to claim 1, wherein the center of a light-emitting portion of said light source is aligned with almost a center in the thickness direction of said light guide.

10. A liquid crystal display device wherein a surface-emitting device according to claim 1 is provided in front of a liquid crystal display unit.

11. A surface-emitting device comprising:
a light guide panel;
a light guide placed along an end face of the light guide panel; and
a light source placed at an end of the light guide,
wherein a side face of the light guide facing the end face of the light guide panel serves as an emergent surface for applying light from the light source to the light guide panel, a side face remote from the emergent surface serves as a reflecting surface on which concave grooves are periodically formed at a predetermined pitch, the concave grooves have pairs of inclined faces for reflecting light propagating inside the light guide, and a depth of the grooves increases exponentially or quadratically toward a center of the light guide.

12. A surface-emitting device according to claim 11, wherein a pitch of the concave grooves is 0.01 mm to 0.5 mm.

13. A surface-emitting device according to claim 11, wherein an angle formed between the two inclined faces is 108° to 112°.

14. A surface-emitting device according to claim 11, wherein a reflective layer composed of a metal thin film is provided at least on the reflecting surface of the light guide.

15. A surface-emitting device according to claim 14, wherein a thickness of the reflective layer is 30 nm to 200 nm.

16. A surface-emitting device according to claim 11, wherein a distance between the emergent surface and the reflecting surface of the light guide is 2.5 mm to 3.5 mm.

17. A surface-emitting device according to claim 11, wherein the center of a light-emitting portion of the light source is aligned with almost a center in a thickness direction of the light guide.

18. A liquid crystal display device wherein a surface-emitting device according to claim 11 is provided in front of a liquid crystal display unit.

19. A surface-emitting device comprising:
a light guide panel;
a light guide placed along an end face of the light guide panel;
a light source placed at an end of the light guide; and
a reflective layer composed of a metal thin film having a thickness of 30 nm to 200 nm,
wherein a side face of the light guide facing the end face of the light guide panel serves as an emergent surface for applying light from the light source to the light guide panel, a side face remote from the emergent surface serves as a reflecting surface on which concave grooves are periodically formed at a predetermined pitch, the concave grooves have pairs of inclined faces for reflecting light propagating inside the light guide, and reflective layer is provided at least on the reflecting surface of the light guide.

20. A surface-emitting device according to claim 19, wherein a pitch of the concave grooves is 0.01 mm to 0.5 mm.

21. A surface-emitting device according to claim 19, wherein an angle formed between the two inclined faces is 108° to 112°.

22. A surface-emitting device according to claim 19, wherein a distance between the emergent surface and the reflecting surface of the light guide is 2.5 mm to 3.5 mm.

23. A surface-emitting device according to claim 19, wherein the center of a light-emitting portion of the light source is aligned with almost a center in a thickness direction of the light guide.

24. A liquid crystal display device wherein a surface-emitting device according to claim 19 is provided in front of a liquid crystal display unit.

25. A surface-emitting device comprising:

a light guide panel;

a light guide placed along an end face of the light guide panel; and a light source placed at an end of the light guide, wherein a side face of the light guide facing the end face of the light guide panel serves as an emergent surface for applying light from the light source to the light guide panel, a side face remote from the emergent surface serves as a reflecting surface on which concave grooves are periodically formed at a predetermined pitch, the concave grooves have pairs of inclined faces for reflecting light propagating inside the light guide, and a distance between the emergent surface and the reflecting surface of the light guide is 2.5 mm to 3.5 mm.

26. A surface-emitting device according to claim 25, wherein a pitch of the concave grooves is 0.01 mm to 0.5 mm.

27. A surface-emitting device according to claim 25, wherein an angle formed between the two inclined faces is 108° to 112°.

28. A surface-emitting device according to claim 25, wherein the center of a light-emitting portion of the light source is aligned with almost a center in a thickness direction of the light guide.

29. A liquid crystal display device wherein a surface-emitting device according to claim 25 is provided in front of a liquid crystal display unit.

* * * * *

UNITED STATES PATENT AND TRADEMARK OFFICE
CERTIFICATE OF CORRECTION

PATENT NO. : 6,954,237 B2
APPLICATION NO. : 10/361791
DATED : October 11, 2005
INVENTOR(S) : Mituso Ohizumi et al.

It is certified that error appears in the above-identified patent and that said Letters Patent is hereby corrected as shown below:

In the Claims

Column 9, in claim 4, line 2, after "exponentially" delete "or" and substitute --and-- in its place.

Column 9, in claim 8, line 2, before "distance between" delete "the" and substitute --a-- in its place.

Signed and Sealed this

Twenty-second Day of August, 2006

JON W. DUDAS
*Director of the United States Patent and Trademark Office*